Oct. 10, 1967 H. S. CRAFTS ETAL 3,346,854

ANALOG STORAGE SYSTEM

Filed March 20, 1963

HAROLD S. CRAFTS
GEORGE E. FORSEN
INVENTORS

BY Samuel Lindenberg

ATTORNEY

United States Patent Office 3,346,854 Patented Oct. 10, 1967

3,346,854
ANALOG STORAGE SYSTEM
Harold S. Crafts and George E. Forsen, Palo Alto, Calif., assignors to Stanford Research Institute, Palo Alto, Calif., a corporation of California
Filed Mar. 20, 1963, Ser. No. 266,645
5 Claims. (Cl. 340—174)

This invention relates to magnetic analog storage systems and more particularly to improvements therein.

In the manufacture of pattern recognition machines of the type which are adaptive, a need has arisen for a storage system which is preferably of the analog storage type, where the information which is in the storage system may be easily altered, and may be read out of the storage system simply, and preferably without destroying the information stored in the process of such readout. Since the information which is stored in these pattern recognition machines comprises a large number of discrete analog quantities, another requirement for the storage system is that the function of addressing a memory for either writing therein or reading therefrom should be as simple as possible.

Accordingly, an object of this invention is the provision of an analog storage system wherein readout occurs therefrom nondestructively.

Another object of this invention is the provision of an analog storage system where access thereto for either write in or readout is very simple.

Yet another object of the present invention is the provision of a unique arrangement of adaptive logic elements to provide a novel and useful analog storage system.

These and other objects of this invention may be achieved in an arrangement of a plurality of unique adaptive logic elements each of which comprises a pair of magnetic cores. These magnetic cores have a relatively opposite sense winding coupled thereon to which a radio frequency excitation is applied. The amplitude of this excitation is insufficient to alter their states of remanence. A readout winding is inductively coupled to these magnetic cores with the same relative winding sense so that the fundamental excitation, applied to these cores, which is induced in this readout winding is cancelled. However, a second harmonic frequency which is induced in the readout winding is not cancelled since it is induced in this winding with a relatively opposite phase from each of the cores, and therefore appears at the winding output terminals with twice the amplitude of the signal induced from a single core. If desired, the winding to which the radio frequency excitation is applied may be coupled to both cores with the same sense, and the readout winding may be coupled to both cores with the same sense. The operation is still the same.

The remanent state of these cores may be altered by applying direct current to the readout winding. The remanent state of the cores is directly and nondestructively indicated by the amplitude as well as the phase of the second harmonic signal in the readout winding.

In accordance with this invention these adaptive logic elements are arranged in an array. Fundamental frequency excitation windings are provided, a separate one of these being coupled to all of the adaptive logic elements in each row of the array. A separate readout winding is provided for each column of adaptive logic elements in said array. Means are provided for selectively exciting, with a suitable radio frequency, the row winding coupled to an adaptive logic element from which it is desired to read out nondestructively. When it is desired to alter the remanent state of an adaptive logic element, then means are provided for applying a radio frequency excitation to the row winding coupled to that adaptive logic element and also means are provided for applying a DC current pulse to the readout winding coupled to the column of adaptive logic elements which includes the desired element.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
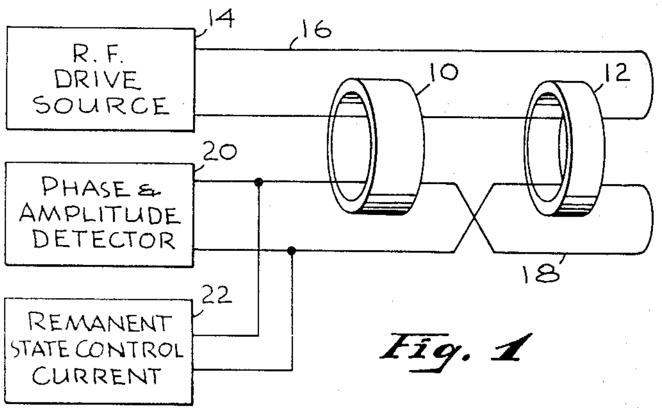
FIGURE 1 is a diagram illustrating a basic adaptive logic element.

FIGURE 1 is a schematic diagram of an adaptive logic element of the type which is employed in the memory system in accordance with this invention. An element of the type shown in FIGURE 1 is described and claimed in an appliaction by Harold S. Crafts, one of the inventors herein, for a Magnetic Analog Device, which was filed Feb. 8, 1963, and bears Ser. No. 257,203. The magnetic cores 10, 12, in FIGURE 1 have substantially rectangular magnetic characteristics with a zero remanent flux state and opposite remanent flux states existing on either side of the zero remanent flux state.

The cores 10, 12, are driven with a radio frequency drive current obtained from an RF drive source 14. The output of this RF drive source at a predetermined oscillation frequency, which by way of example may be 100 kc. per second, is applied to a winding 16 that is inductively coupled to the cores 10, 12 with the same relative sense. The amplitude of the excitation by the RF drive source 14 is made less than the amount required to vary the remanent flux states of the cores, and yet is not made so low that a second harmonic distortion voltage, which is induced in response thereto in an output winding 18, is not detectable.

The winding 16 will be hereafter designated as the RF drive winding. The winding 18, the output winding, is inductively coupled to the respective cores 10, 12, with their respective opposite coupling sense. As a result, the fundamental frequency which is induced in this winding is cancelled out by reason of the opposite coupling of this winding to the cores. The output winding 18 is coupled to a phase and amplitude detector 20 which detects a second harmonic distortion voltage having an amplitude proportional to the amount of remanent flux in the cores and having a phase which indicates on which side of the zero remanent flux, the remanent flux states of the cores 10, 12, exists. The remanent flux level of the cores can be readily altered by applying a direct current from a remanent state control current source 22, to the output winding 18.

The second harmonic output voltage characteristic of the cores can be explained on the basis of a simple model of a core such as is shown in FIGURE 1. In a square loop magnetic characteristic material, the magnetic domains are oriented along the direction of the tape. The domains may be oriented in either of two opposing directions. The flux density in the domains is essentially constant, and the remanent state of the core can be defined by the net flux, which is simply the difference between the fluxes in the oppositely directed domains. Since the flux density is constant this amounts to defining the remanent state of the core as the difference in the domain areas through the cross section of the core. The output voltage then becomes the difference between the effect of the drive current on the oppositely directed domains. The second harmonic output voltage will be at maximum, therefore, when the core is saturated, and it consists of a single domain oriented in one direction. When domains oriented in opposite directions have equal area, the output voltage will be zero. As the net magnetization of the core decreases from the maximum, goes through zero and increases to a maximum again in an opposite direction, the output voltage will likewise decrease from a maximum, change its phase by 180 degrees as it goes through zero, and increase to a maximum. Hence, the state of the core may be sensed nondestructively with the second harmonic distortion voltage. If two cores are used, the fundamental voltage component can be cancelled out by the manner of the coupling to the cores to the output winding, leaving only the second harmonic voltage in the output. The sinusoidal RF drive current produces two effects which are essential to the operation of the device. The first effect is the nondestructive readout which has already been discussed. The other effect is equally important. Due to the presence of the drive current, the apparent coercive force of the core is greatly reduced. As a result, undesirable effects due to the coercive force of the cores are reduced. Also a smooth transition between remanent states can occur.

If a constant current exceeding the switching threshold is applied to the output winding from the source 22, the remanent state of the cores will be changed. The change is probably due to magnetic flux being switched by the irreversible domain wall movement. The domain wall movement is sensed by a change in the second harmonic output voltage. The rate of magnetic flux switching is proportional to the difference between the switching current in the output winding and the current threshold. Since the threshold is approximately constant, the remanent state of the cores will change at a fairly constant rate.

A voltage will be developed across the output winding proportional to the rate at which flux is being switched in the cores by the current from the source 14. This voltage has no effect on the remanent state control current source 22.

Figure 2:
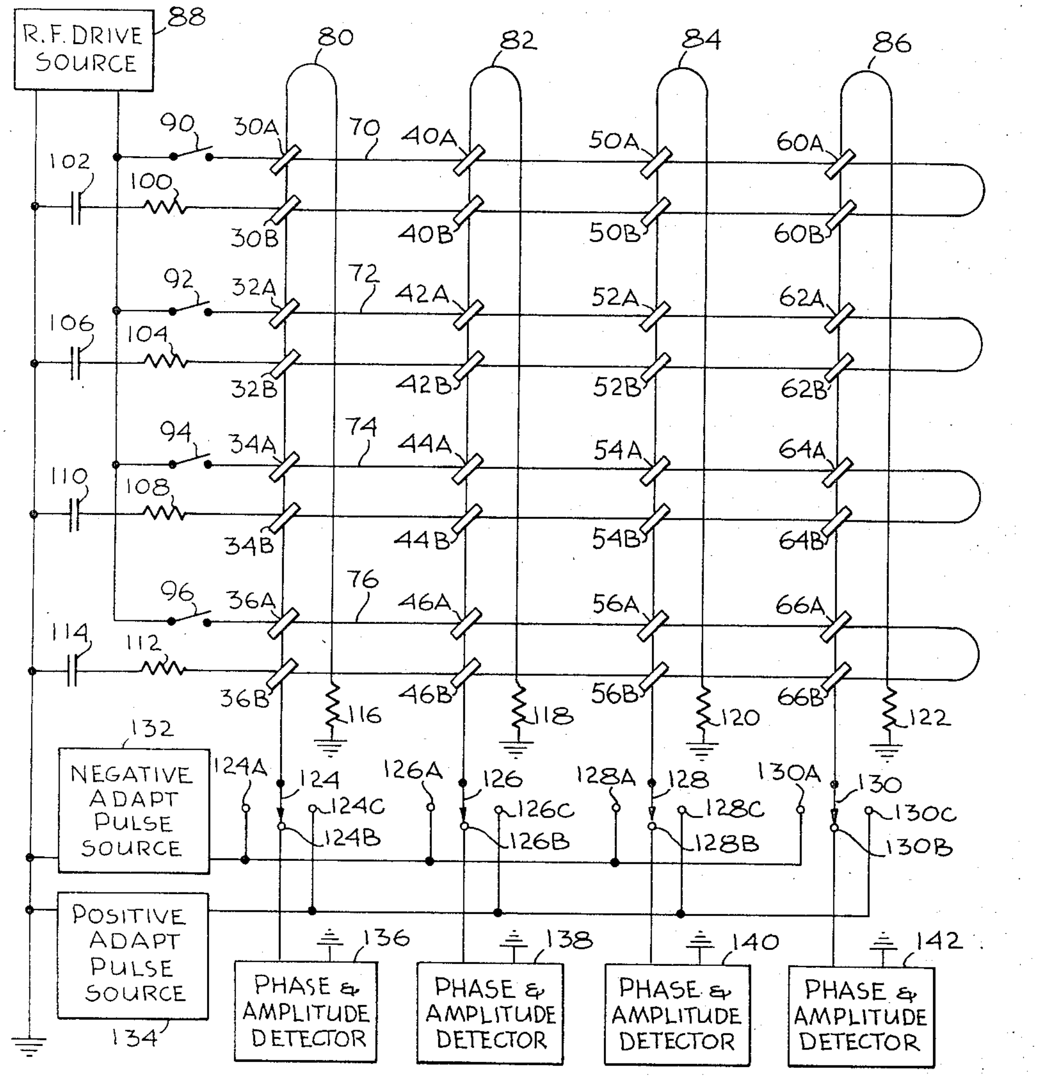
FIGURE 2 is a circuit diagram in accordance with this invention of a memory system employing adaptive logic elements.

Reference is now made to FIGURE 2 of the drawing which shows a schematic diagram of an embodiment of this invention. A plurality of adaptive logic elements each comprising two cores respectively 30A, 30B through 66A, 66B, are arrayed in columns and rows, or as a matrix. A separate high frequency drive winding respectively 70, 72, 74, and 76, is provided for each row of adaptive elements. A separate readout winding respectively 80, 82, 84, 86, is provided for each column of adaptive logic elements. While the matrix arrangement shown in FIGURE 2 shows only 16 adaptive elements arranged in a 4×4 array, it is to be understood that this is only by way of illustration and should not be considered restrictive. Those skilled in the art will readily appreciate and understand how to construct a memory system, in accordance with this invention having any desired size.

It should be noted that the RF drive windings respectively 70 through 76 are inductively coupled to each pair of magnetic elements in each row with a relatively opposite sense, while the output windings respectively 80 through 86, are inductively coupled to the magnetic elements in the respective columns with the same relative coupling sense. While this is the reverse of the arrangement shown in FIGURE 1 for the coupling senses of the respective drive and output winding, it will be appreciated that the net result is the same. That is, since the cores are now excited with an opposite sense by the primary RF drive current, the fundamental frequency will be induced with a relatively opposite phase in a winding coupled to the two cores with the same sense and thereby will cancel.

The drive winding 70 may be connected to one side of the output from drive source 88 through a switch 90, and to the other side of the drive source 88, through a series connected resistor 100 and capacitor 102. One side of the drive winding 72 may be connected selectively to one side of the output of the RF drive source 88 through a switch 92, and the other side of the winding 72 is connected to the other side of the RF drive source output through a series connected resistor 104 and capacitor 106. One side of the drive winding 74 may be selectively connected to one side of the output of the RF drive source 88 through a switch 94, and the other side of the winding 74 is connected to the other side of the RF drive source through a series connected resistor and capacitor respectively 108, 110. One side of the drive winding 76 is connected to one side of the RF drive source 88 through a switch 96, and the other side of the winding 76 is connected to the other side of the drive source output through a series connected resistor 112, and capacitor 114.

One side of the respective output winding 80, 82, 84, and 86 is respectively connected to ground through resistors 116, 118, 120 and 122. The other side of each of the respective output windings is respectively connected to a three position switch respectively 124, 126, 128, and 130. Each one of these three positions switches can be moved to make contact with one of three terminals respectively 124A through 130A, or 124B through 130B, or 124C through 130C. All of the A terminals are connected to a negative adapt pulse source 132. All of the C terminals are connected to a positive adapt pulse source 134. Each one of the B terminals is connected to a separate phase and amplitude detector respectively 136 through 142. For example, if it is desired to apply a negative adapt pulse of current to the winding 80 then the switch 124 is moved to connect this winding to terminal 124A. If it is desired to connect the winding 82 to the positive adapt pulse source then the switch 126 is moved to connect this winding to terminal 126C. Connection of any one of these switches to their "B" terminals connects the output windings to the phase and amplitude detectors.

By way of example, and not to be construed as a limitation upon the invention, one embodiment of the invention which was built, employed two tape wound, nickel iron alloy, square loop cores having a diameter of approximately 400 mils. A high frequency current on the order of 100 kc., whose period is shorter than the nominal switching time was employed. It was found that the remanent flux state of the core could be changed by the combination of the high frequency current and a direct current bias while neither of these by itself could switch any flux permanently. The voltage developed at the output winding terminals when the cores are driven by an RF frequency in the manner described was found to have considerable harmonic content. It was found that the second harmonic component of the fundamental frequency was very sensitive and apparently varies linearly with the remanent state of the core. The amplitude and phase of this second harmonic content indicated the amount and direction (respectively) of the net remanent flux in the core. It was further found that the maximum high frequency current drive that could be applied to a core pair without disturbing the remanent flux state was on the order of two ampere turns peak to peak; however, a more linear storage characteristic is obtained at lower drive levels. Thus the selection of the ampere turns of RF drive is a compromise between linearity and equipment complexity. A value of 1.2 ampere turns is selected for this compromise. The ratio of second harmonic to fundamental in the output of each core at this drive level is approximately 1 to 10 and the ratio in the summed output of a core pair is approximately 4 to 1. This cancellation of the fundamental in the readout circuit of the core pair is equivalent to a 26 db rejection filter. The maximum direct current bias that can be applied to a core pair which does not disturb the remanent flux state in the absence of an RF drive is approximately 200 milliampere turns. The smallest usable direct current bias (adapt current) is about 100 milliampere turns. This gives at least a 2:1 range in permissible adapt current when requiring a coincidence of high frequency current and adapt current to change the remanent flux state.

The use of a variable adapt current duration can allow changes of different magnitudes to be made automatically. However, in order to obtain for example, 1000 increments over the total range (inclusive of either side of zero remanent state) the adapt pulse duration which is to be employed with the embodiment of the invention should have a minimum value necessary for permanent switching (approximately five microseconds at an adapt pulse current level of 200 milliampere turns). It is preferred to use a succession of pulses for effecting a desired change in remanent state instead of using variable width pulses.

When magnetic ferrite cores are used for the adaptive logic element it is found that the frequency of the RF drive source should be much higher. By way of example, using a commercially available type of magnetic ferrite core having an 80 mil outside diameter and a 50 mil inside diameter an RF drive having a 5 megacycle per second frequency was employed. This drive must be kept small enough to avoid undue heating of the core, as well as small enough not to change the state of remanence of the core. The state of remanence of the cores is determined by using direct current preferably in the form of pulses. An indication of the state of magnetic remanence is obtained by the amplitude of the second harmonic as well as its phase, exactly as has been described.

To operate the system shown in FIGURE 2, for readout any one of the switches 90 through 96 may be closed whereby the remanent storage states of the adaptive logic elements in the row excited by the RF drive source is detected by the phase and amplitude detectors 136 through 142. The remanent states of the adaptive logic elements which are thus read out are not altered by the readout process.

The manner of writing into the memory system is best illustrated by an example. Assumed that it is desired to alter the remanent state of the adaptive logic element comprised of the core pairs 54A and 54B. If it is desired to alter the remanent state of these cores in a negative going direction, then first the switch 94 is closed to apply the RF excitation to this core pair and then the switch 128 is operated to make contact with terminal 128A. This applies a pulse from the negative adapt pulse source 132 to the core pair 54A, 54B, altering their remanent state, an increment for each one of the pulses received from the pulse source. If it were desired to alter the remanent state of the core pair 54A, 54B, in a positive going direction, then the switch 128 would be operated to make contact with terminal 128C whereby a pulse or pulses may be received from the positive adapt pulse source 134 to alter the state of remanence of the core pair 54A, 54B. None of the other core pairs 50A, 50B, 52A, 52B, and 56A, 56B, are affected by the current pulse applied to the winding 84 since these other core pairs are not being excited by an RF drive source. Therefore, as far as these core pairs are concerned the current pulse is below the minimum threshold for altering their remanant states. As was previously indicated, this minimum threshold is reduced by the application of an RF drive to a core pair.

The switches 90 through 96, and 124 through 130 exemplify any suitable electronic switching devices which may be operated in the manner described for the mechanical switches. Therefore, these mechanical switches are by way of exemplification and are not to be considered as a limitation upon this invention.

The description of the operation of the memory system thus far has indicated that it may be operated as a random access device as far as a single adaptive logic element is concerned. It should be appreciated however, that an entire row of adaptive logic elements may be written into simultaneously when any one of the switches 90 through 96 are closed. Also any selected combination of columns of adaptive logic elements may be written into simultaneously by closing the corresponding switches 90 through 96. The instructions for altering the states of the adaptive logic elements are obtained by apparatus, now shown here, which operates to compare the outputs from the various phase and amplitude detectors 136 through 142 with other quantities or signals.

There has been accordingly shown and described herein a novel, useful and improved memory system whereby information in analog form may be stored rapidly and accurately in predetermined locations and this information may be read out without destroying or altering the information as it is stored in said memory system.

We claim:

1. A random access magnetic analog storage system comprising a plurality of magnetic adaptive logic elements arranged in rows and columns, each element having a plurality of states of magnetic remanence, means for determining the state of magnetic remanence of a predetermined one of said magnetic adaptive logic elements including a source of oscillation at a predetermined frequency, means for selectively applying oscillations from said source to a row of said elements including said predetermined one of said magnetic adaptive logic elements, said means including a winding means connected to said source of oscillations and wound on each core in said row of cores with a single winding sense, and means for deriving from said predetermined one of said magnetic adaptive logic elements a signal having a higher frequency than said predetermined oscillation frequency and having an amplitude and phase representative of the state of magnetic remanence of said predetermined adaptive logic element; and means for altering the state of magnetic remanence of said predetermined adaptive logic element including means for selectively applying to the column of adaptive logic elements including said predetermined one of said elements a magnetomotive force which is less in the absence of oscillations from said source being applied than the threshold required to be exceeded to alter the remanent state of an adaptive logic element but which in the presence of said oscillations from said source exceeds said threshold, whereby only the predetermined one of said adaptive logic elements has its remanent state altered.

2. A random access magnetic analog storage system comprising a plurality of magnetic adaptive logic elements arranged in rows and columns, each element having a plurality of states of magnetic remanence, means for determining the state of magnetic remanence of a predetermined one of said magnetic adaptive logic elements including a source of oscillation at a predetermined frequency, said means including a winding means connected to said source of oscillations and wound on each core in said row of cores with a single winding sense, means for selectively applying oscillation from said source to a row of said elements including said predetermined one of said magnetic adaptive logic elements, and means for deriving from the winding means coupled to the column of elements including said predetermined element a signal having a higher frequency than said predetermined oscillation frequency and having an amplitude and phase representative of the state of magnetic remanence of said predetermined adaptive logic element; and means for altering the state of magnetic remanence of said predetermined adaptive logic element including means for selectively applying electrical current to the winding means coupled to the column including said predetermined element while said element has said oscillation(s) at said predetermined frequency applied thereto for placing said adaptive logic element in a desired one of its remanent flux states, the amplitude of the electrical current applied by said means for applying electrical current being insufficient to alter the remanent flux state of said adaptive logic element in the absence of the application thereto of said oscillations from said means for applying oscillation.

3. A magnetic analog storage system comprising a plurality of pairs of magnetic cores disposed in an array of columns and rows, a source of radio frequency oscillation at a predetermined frequency, means for selectively applying oscillation(s) from said radio frequency source to a predetermined row of said pairs of cores, said means including a winding means connected to said source of oscillations and wound on each core in said row of cores with a single winding sense, means for seperately deriving from each magnetic core pair excited from said radio frequency source of oscillation(s) an output having a frequency harmonically related to the frequency of said radio frequency source of oscillation and which represents in amplitude and phase the remanent state of said magnetic core pair, and means for altering the remanent state of a predetermined one of said magnetic core pairs to which said radio frequency excitation is applied comprising means for selectively applying a magnetomotive force to said magnetic core pair having an amplitude which is less than the threshold required to be exceeded to alter the remanent state of said magnetic core pair in the absence of the excitation from said radio frequency source but greater than the threshold required to be exceeded to alter the remanent state in the presence of said excitation.

4. A magnetic analog storage memory system comprising a plurality of pairs of cores arrayed in columns and rows, a separate drive winding for each row of magnetic core pairs, each said drive winding being inductively coupled to one of the cores of a core pair with a relative coupling sense which is opposite to the sense of coupling to the other core of a core pair, a separate output winding for each column of magnetic core pairs, each of said output windings being inductively coupled to all of the magnetic core pairs in a column with the same relative coupling sense, a source of radio frequency oscillation(s) having a predetermined fundamental frequency, means for selectively applying the output from said source of radio frequency oscillation(s) to one of said drive windings to thereby induce in each of said output windings a signal having a frequency which is harmonically related to said fundamental frequency and having an amplitude and phase representative of the remanent state of the magnetic core pair to which said output winding is inductively coupled, and means for altering the remanent state of a predetermined one of said magnetic core pairs to which said radio frequency oscillation is applied comprising means for applying to the output winding coupled to said predetermined magnetic core pair direct current having an amplitude which is sufficient to alter the state of magnetic remanence of said magnetic core pair only while said radio frequency oscillation is also applied thereto.

5. A magnetic analog storage system comprising a plurality of pairs of magnetic cores, each having a substantially zero flux state and opposite remanent flux states on either side of said zero flux state, said plurality of pairs of cores being disposed in an array of columns and rows, a separate drive winding for each row of said core pairs, each said drive winding being inductively coupled to all of said core pairs in said row, the sense of said coupling on one of said cores of a core pair being relatively opposite to the sense of the coupling of said winding on the other core of said core pair, a source of radio frequency oscillation at a predetermined fundamental frequency, the amplitude of said radio frequency oscillation source being established as less than the amplitude required for varying the state of magnetic remanence of a magnetic core pair, means for selectively applying the output of said radio frequency source to one of said drive windings, a plurality of output windings, a separate output winding being associated with a separate column of core pairs and being inductively coupled with the same relative coupling sense to all the core pairs in said column of core pairs, means for selectively deriving from a drive winding a signal having a frequency harmonically related to said fundamental frequency and having an amplitude and phase indicative of the magnetic remanence of a core pair coupled to an excited one of said drive windings, and means for altering the state of remanence of a core pair comprising a source of electrical current having an amplitude which is sufficient to alter the state of remanence of a core pair only while excitation from said radio frequency source is being applied, and means for selectively connecting said source of electrical current to an output winding coupled to a core pair which is also coupled to a drive winding connected to said source of radio frequency oscillations.

References Cited

UNITED STATES PATENTS

| | | | |
|---|---|---|---|
| 2,958,074 | 10/1960 | Kilburn | 340—174 |
| 3,004,243 | 10/1961 | Rossing | 340—174 |
| 3,181,131 | 4/1965 | Pryor | 340—174 |
| 3,182,296 | 5/1965 | Baldwin | 340—174 |
| 3,189,879 | 6/1965 | MacIntyre | 340—174 |
| 3,231,874 | 1/1966 | James | 340—174 |

BERNARD KONICK, *Primary Examiner.*

M. S. GITTES, *Assistant Examiner.*